United States Patent
Yang et al.

(10) Patent No.: US 6,651,431 B1
(45) Date of Patent: Nov. 25, 2003

(54) BOOSTED INTERNAL COMBUSTION ENGINES AND AIR COMPRESSORS USED THEREIN

(75) Inventors: Jialin Yang, Canton, MI (US); Peter Hofbauer, West Bloomfield, MI (US); Lixin Peng, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,913

(22) Filed: Aug. 28, 2002

(51) Int. Cl.$^7$ ................................................ F02B 33/44
(52) U.S. Cl. ................ 60/605.1; 415/208.3; 415/211.2; 123/559.1
(58) Field of Search ...................... 60/605.1; 415/208.4, 415/211.2, 211.1, 208.3; 123/559.1

(56) References Cited

U.S. PATENT DOCUMENTS

| | | | | |
|---|---|---|---|---|
| 3,143,103 A | * | 8/1964 | Zuhn | ........................... 60/599 |
| 3,829,235 A | * | 8/1974 | Woollenweber, Jr. | ..... 415/211.2 |
| 4,052,843 A | | 10/1977 | Takizawa | |
| 4,533,294 A | * | 8/1985 | Onal | ......................... 415/119 |
| 5,173,021 A | | 12/1992 | Grainger et al. | |
| 5,178,516 A | | 1/1993 | Nakagawa et al. | |
| 5,310,309 A | | 5/1994 | Terasaki et al. | |
| 6,148,616 A | | 11/2000 | Yoshida et al. | |
| 6,324,847 B1 | | 12/2001 | Pierpont | |
| 6,324,848 B1 | | 12/2001 | Gladden et al. | |
| 6,345,503 B1 | | 2/2002 | Gladden | |

FOREIGN PATENT DOCUMENTS

| | | |
|---|---|---|
| EP | 0526965 | 1/1997 |
| JP | 2000-257437 | 9/2000 |
| WO | 98/16747 | 4/1998 |
| WO | 00/01935 | 1/2000 |

* cited by examiner

Primary Examiner—Sheldon J. Richter
(74) Attorney, Agent, or Firm—Diana D. Brehob

(57) ABSTRACT

An inlet air compressor for an internal combustion engine is provided which has one inlet and a plurality of outlets. Within the compressor are disposed a plurality of diffusers coupled to the plurality of outlets. The flow is divided among the plurality of outlets so that at conditions of low overall flow rate through the engine, which would, in a compressor according to the prior art, ordinarily surge, allow the flow to be substantially discontinued through one or more diffusers and continue at through the remaining diffusers. In this way, the diffusers with flow operate within an acceptable operating range and avoid a surging condition. The present invention is directed to engines having a wide range of flow rates. A couple of examples are gasoline engines and variable displacement engines.

25 Claims, 4 Drawing Sheets

BOOSTED INTERNAL COMBUSTION ENGINES AND AIR COMPRESSORS USED THEREIN

BACKGROUND OF INVENTION

1. Field of the Invention

The present invention relates generally to boosted internal combustion engines and air compressors used therein. More particularly, the invention relates to variable displacement internal combustion engines and air compressors used therein adapted to operate over a wide range of airflow rates.

2. Background of the Invention

As is known in the art, for conventional boosted internal combustion engines, such as supercharged or turbocharged engines, an air compressor pressurizes air in the intake of the engine. By increasing density in the intake, the engine inducts and combusts a greater amount of air and fuel, thereby increasing the power output of the engine. One such compressor is a centrifugal compressor having: an impeller rotatable about an axial shaft for forcing air entering along the axis outwardly toward the outer circumferential region of the compressor, an outlet disposed along a portion of the circumferential portion, and a diffuser disposed in the outlet for converting the kinetic energy of the air forced toward the circumferential portion into air pressure as the air passes through the outlet. Diffuser is a term of art applied to centrifugal compressors. Air at high velocity enters the diffuser and is slowed down in the diffuser with a consequent increase in pressure. Typically, the diffuser contains stator blades (alternatively called guide vanes) to provide efficient energy conversion. Alternatively, the diffuser can be without blades or vaneless.

As is also known in the art, the operating range of the air compressor is limited by choking at high airflow rates and surging at low airflow rate. Surge is an unstable operating condition, which is to be avoided. In the stable operating region of a compressor operating map, when outlet air flow is restricted, the pressure rises to counteract the restriction. But, in the unstable region of the operating map, a further restriction causes the pressure of the compressor to fall. Higher pressure air in the delivery pipe surges back through the compressor. But, with this pressure relief, the compressor responds by rebuilding pressure, causing flow in the forward direction. The constant flow reversals lead to this surging condition. It is typical to match the engine demands to the compressor to avoid choking or surging. However, this presents a challenge, particularly in gasoline engines, which are typically throttled, when the ratio between the highest and lowest airflow rates is great.

As is also known in the art, one type of internal combustion engine is a variable displacement engine (VDE) in which a portion of the cylinders are deactivated during low power conditions. When boosting is used with such VDE, it has been proposed to use two or more air compressors separately coupled to active or inactive cylinders. In such an arrangement, the compressor coupled to inactive cylinders is deactivated. Such a solution, however, is costly and complex.

U.S. Pat. No. 5,310,309 discloses a centrifugal compressor, which is designed for avoiding surging at low airflow rates. Stator blades are arranged in the diffuser of the compressor. The stator blades have leading edges inclined in the downstream direction while extending away from a side plate toward a core plate. Auxiliary blades are arranged at positions inward of the stator blades. The auxiliary blades shift the surge limit to lower airflows. However, these blades do not shift the surge limit to the extent needed for a high reduction in airflow, for example when using the compressor to charge a VDE, where the airflow is reduced drastically when some cylinders are deactivated. Furthermore, an additional manufacturing step is used to provide a compressor with auxiliary blades.

SUMMARY OF INVENTION

In accordance with the invention, a compressor is provided having a compressor housing defining an air inlet and a plurality of air outlets adapted to be fed air from the air inlet. A rotatable shaft with a plurality of impeller blades coupled to said rotatable shaft is disposed within the housing. A plurality of diffusers is provided, each one of the diffusers being coupled to one of the air outlets.

With such an arrangement, a compressor is provided having a common housing with a plurality of air outlets.

Further, with such an arrangement, airflow from one of the air outlets can be changed relative to the airflow from the other one of the air outlets. In one embodiment, the airflow from one outlet can be stopped so that air flows through the other outlets only. In the case of a two air outlet compressor, the velocity of the air flowing through the open outlets and the corresponding diffuser therein is roughly twice that compared to having one outlet due to the reduction in cross-section. Consequently, the compressor is less likely to access the surging condition.

An advantage of the invention is that the surge limit of a compressor with the two air outlets is shifted to lower airflow. This is useful under the following exemplary operating conditions of the engine: low engine speed, at closed throttle, or when operating with some of the cylinders deactivated in a VDE engine.

Further, with such an arrangement, the compressor unit has, in effect, a plurality of compressors housed in one package.

In one embodiment, at least one partition wall separates a pair of the plurality of diffusers.

In one embodiment, each of the impeller blades has a slot extending radially inward, and the partition wall between each pair of diffusers extends radially into the slots of the impeller blades.

In one embodiment, a separator is coupled to the impeller blades.

In one embodiment, the partition wall is positioned substantially perpendicular with respect to an axis of rotation of the shaft.

In accordance with another feature of the invention, a variable displacement engine is provided. The engine includes a plurality of sets of combustion cylinders. A compressor is provided having a rotatable shaft; a compressor housing defining an air inlet and a plurality of air outlets; a rotatable shaft disposed within the housing; and a plurality of impeller blades coupled to the rotatable shaft and disposed within the housing; and a plurality of circumferential diffusers disposed within the housing, each one of the diffusers being coupled to a corresponding one of said air outlets which is further coupled to a corresponding one of said set of combustion cylinders. At least one of said sets of combustion cylinders is deactivated, thereby causing flow in said diffusers corresponding to said deactivated combustion cylinders to substantially stop.

In a further embodiment of the invention, a partition wall, or septum, is disposed between the two air diffusers. The partition wall divides the airflow so that the air is divided as it comes off the impeller blades. During low airflows, efficiency of the compressor is improved when one of the outlets is closed. In one of the diffusers, the air passages are smaller so that the streaming air is of a velocity within the diffuser not within the surge limit.

In one embodiment, each impeller blade has a slot extending radially inward and the partition wall of the compressor housing between the diffusers of such air outlets extends radially into the slots of the impeller blades, forming two sub-compressors. In this way, the flow is substantially divided within the impeller section.

In a further embodiment, the compressor wheel has a separator coupled to the impeller blades. The separator separates the airflow near the compressor shaft to shift surging of the compressor to lower airflows. In this embodiment, the separator causes the flow to divide at the upstream portion of the impeller blades.

The above advantages, other advantages, and other features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, with reference to the accompanying drawings wherein.

DETAILED DESCRIPTION

Figure 1:
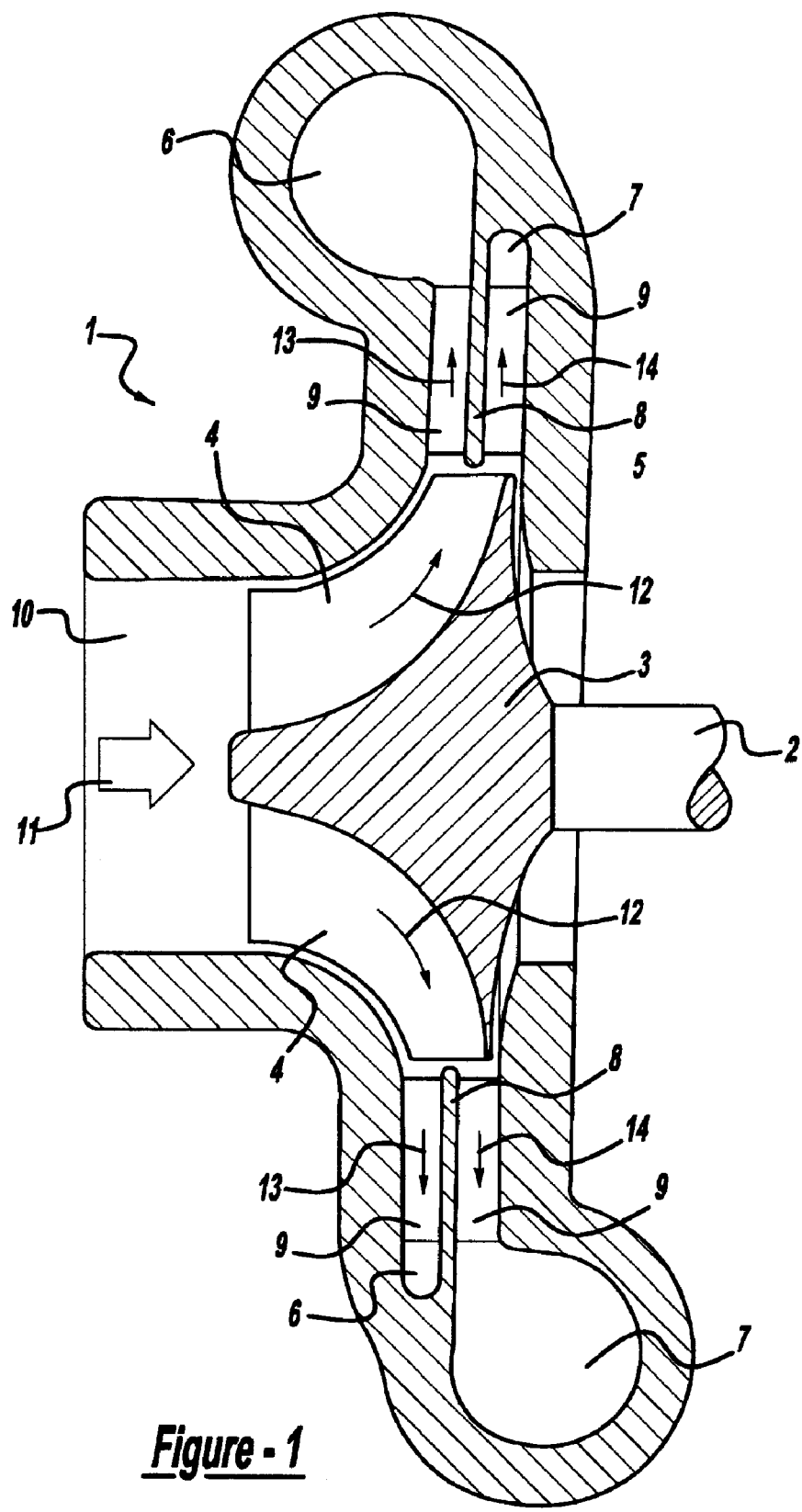
FIG. 1, is a longitudinal cross-sectional view of a compressor with circumferentially arranged diffusers according to an aspect of the present invention.

Referring to FIG. 1, a cross-section of a compressor 1 is illustrated. A shaft 2 and a compressor wheel 3, having impeller blades 4, are rigidly connected together. Elements 2, 3, and 4 are disposed within a compressor housing 5. Shaft 2 can be driven by any source, preferably by the turbine of a turbocharger, which is not shown here. The compressor housing 5 forms a first diffuser 6 and a second diffuser 7. Both diffusers are separated by partition wall 8. A plurality of stator blades 9 are arranged in both diffusers 6 and 7. Through air inlet 10, intake airflow 11 is drawn into compressor housing 5 and is accelerated by impeller blades 4 of the rotating compressor wheel 3. When impeller airflow 12 leaves impeller blades 4, it is divided into two air streams, whereby first air stream 13 flows into first diffuser 6 and second air stream 14 flows into second diffuser 7. Although partition wall 8 is shown in FIG. 1 in a central position with equal widths of diffusers 6 and 7 in the area of stator blades 9, partition wall 8 can be biased away from the center so that the width of one of the diffusers is bigger than the other. This can be applied to the situation when the compressor is designed for different maximum airflows through first diffuser 6 and second diffuser 7, for example.

Figure 2:
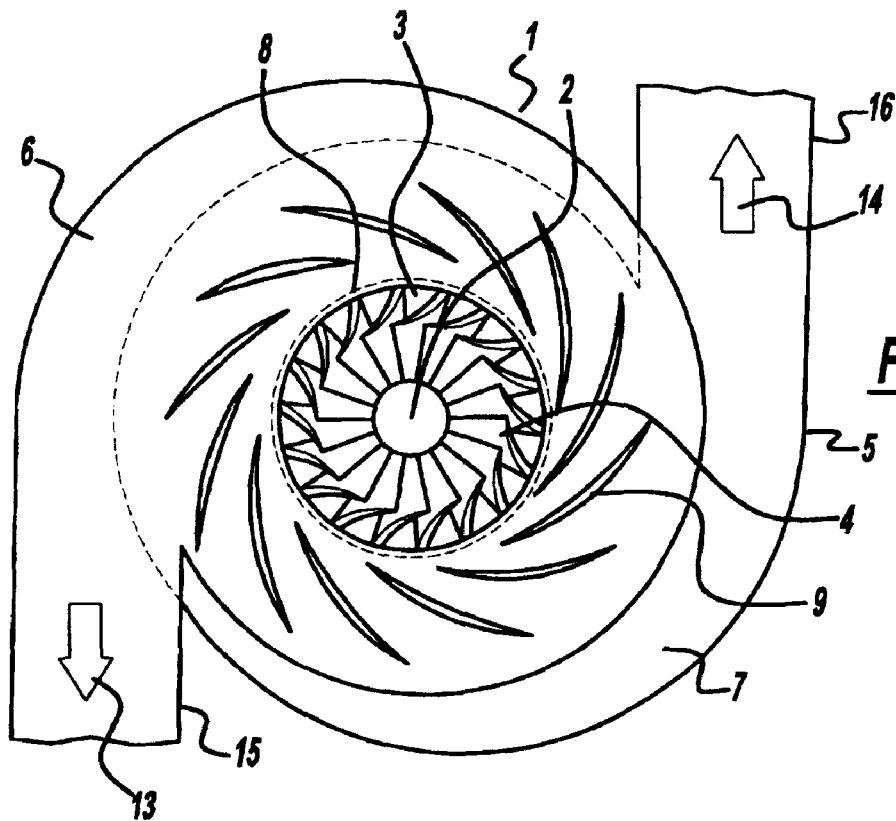
FIG. 2 is an axial view of the compressor in FIG. 1.

FIG. 2 shows a schematic view of compressor 1 in the axial direction of compressor shaft 2. Compressor wheel 3 with impeller blades 4 is located centrally in compressor housing 5, circumferentially surrounded by stator blades 9 in first diffuser 6 and second diffuser 7. First diffuser 6 is coupled to a first outlet 15 where the first air stream exits 13. Second diffuser 7 is coupled to a second outlet 16 where the second air stream exits 14. A further advantage of the present invention can be seen in FIG. 2, as the outlets are positioned at different circumferential positions at the compressor housing 5. Both outlets can be arranged at any circumferential position to achieve easy access, to provide for simple coupling to further conduits, pipes, and air intakes, as examples, and to allow for optimal packaging of compressor 1.

When a low airflow is required, due to deactivation of some cylinders of a VDE or due to a low flow operating condition of the engine, second outlet 16 is closed, as will be described in more detail in connection with FIG. 7. Suffice it to say here, however, that when closed all of inlet airflow 11 flows through first diffuser 6, while nearly no air flows through second diffuser 7. Thus, first airflow 13 in first diffuser 6 is nearly equal to intake flow 11, and is therefore much higher than it would be without second outlet 16 closed. The higher airflow through diffuser 6 avoids surging at lower intake airflows 11, thereby causing the surge limit of compressor 1 to be shifted to lower limits.

Figure 3:
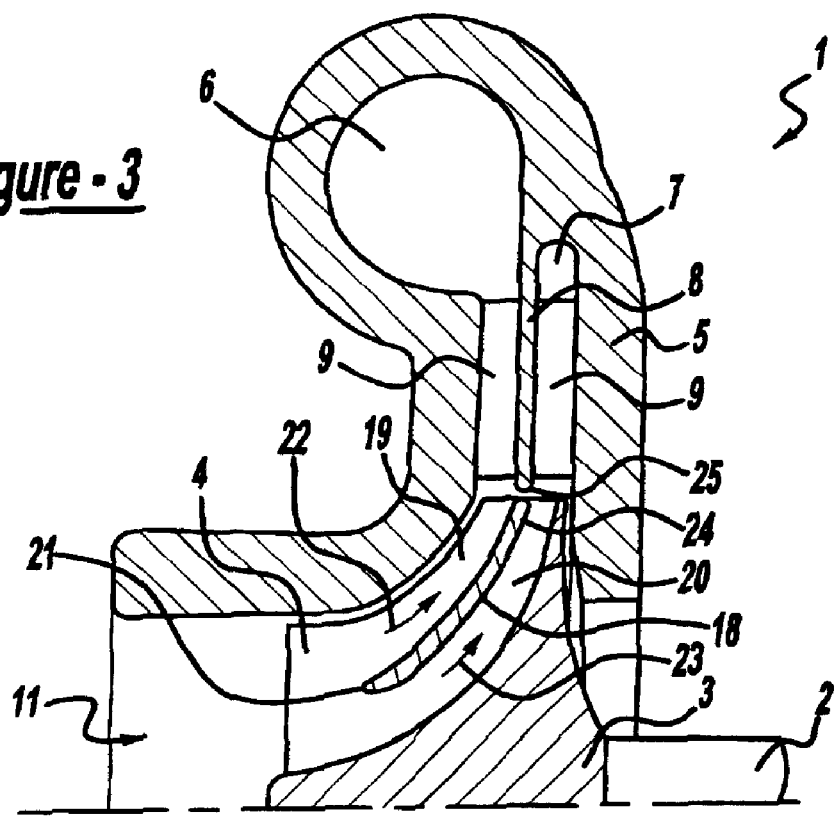
FIG. 3 is a partial longitudinal cross-sectional view of a compressor with a separator according to another aspect of the present invention.

In FIG. 3, a further embodiment of compressor 1 with a separator 18 intersecting with impeller blades 4 is shown. Compressor wheel 3, separator 18, and impeller blades 4 are made, preferably, from one part, e.g., a metal casting. Separator 18 creates first air channel 19 and second air channel 20 on compressor wheel 3. This causes inlet airflow 11 to be separated at inner radius 21 of separator 18 in a first airflow 22 and a second airflow 23. At its outer radius 24, separator 18 corresponds with inner radius 25 of partition wall 8, so that first airflow 22 and second airflow 23 are separately flowing into corresponding first diffuser 6 and second diffuser 7, respectively.

Figure 4:
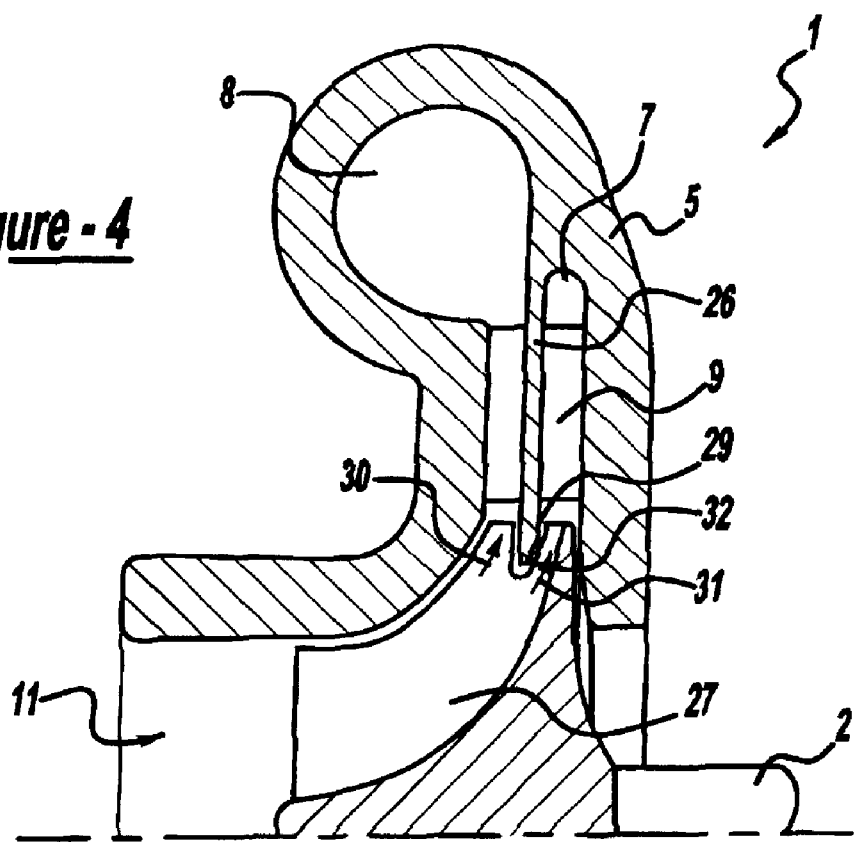
FIG. 4 is a partial longitudinal cross-sectional view a compressor with an extending partition wall according to another aspect of the present invention.

FIG. 4 illustrates a further embodiment of compressor 1 with a partition wall 26 extending radially inward and impeller blades 27, each of them having a slot 28. Partition wall extension 29 of partition wall 26 mates with slots 28 from impeller blades 27. Similar to the design shown in regards to FIG. 3, inlet airflow 11 is separated into a first airflow 30 and a second airflow 31 at inner radius 32 of partition wall extension 29.

Figure 5:
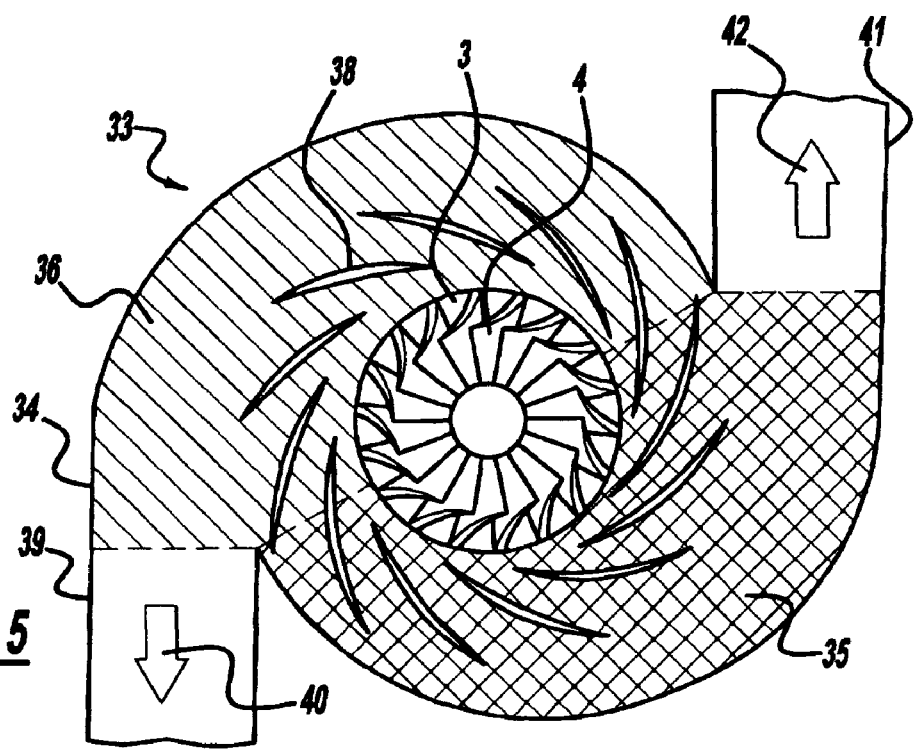
FIG. 5 is an axial view of a compressor with diffusers arranged on the circumference according to an aspect of the invention.
Figure 6:
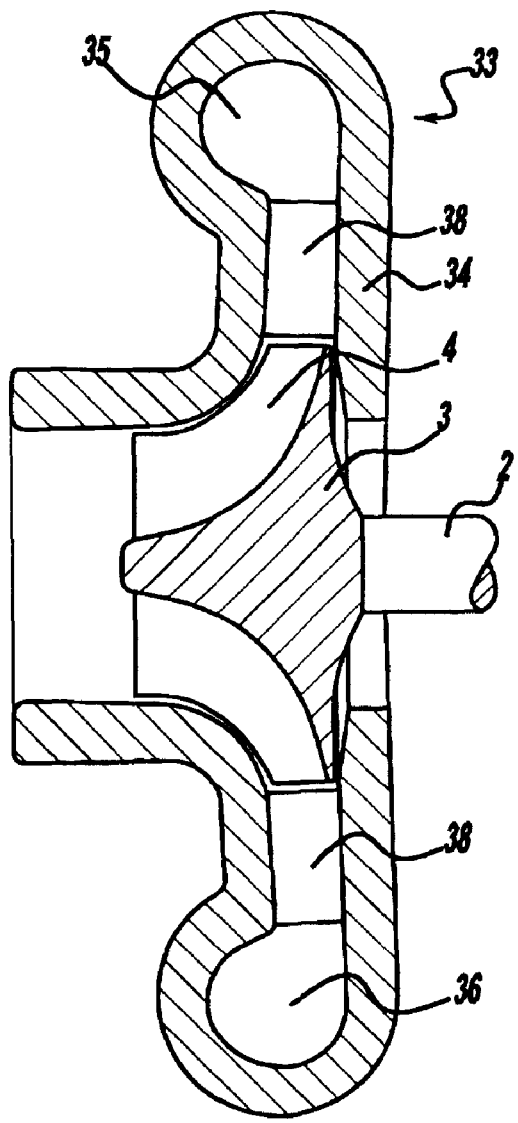
FIG. 6 is a longitudinal cross-sectional view of a compressor in FIG. 5.

Referring to FIGS. 5 and 6, a compressor 33 comprises a compressor wheel 3 with impeller blades 4, located in compressor housing 34. A first diffuser 35 and a second diffuser 36 are arranged on the same circumference at the compressor housing 34. The approximate area of each diffuser is illustrated in FIG. 5 by different textures. Compressor wheel 3 is surrounded circumferentially by stator blades 38, which are located in first diffuser 35 and second diffuser 36. First diffuser 35 is coupled to a first outlet 39, where first air stream 40 exits. Second diffuser 36 is coupled to a second outlet 41, where the second air stream exits. Preferably, outlets 39 and 41 are opposed to each other, with respect to the axis of compressor 33. Accordingly, diffusers 35 and 36 each extend over approximately half of the circumference. However, the area ratio can be varied depending on the desired maximum airflow through each diffuser.

Figure 7:
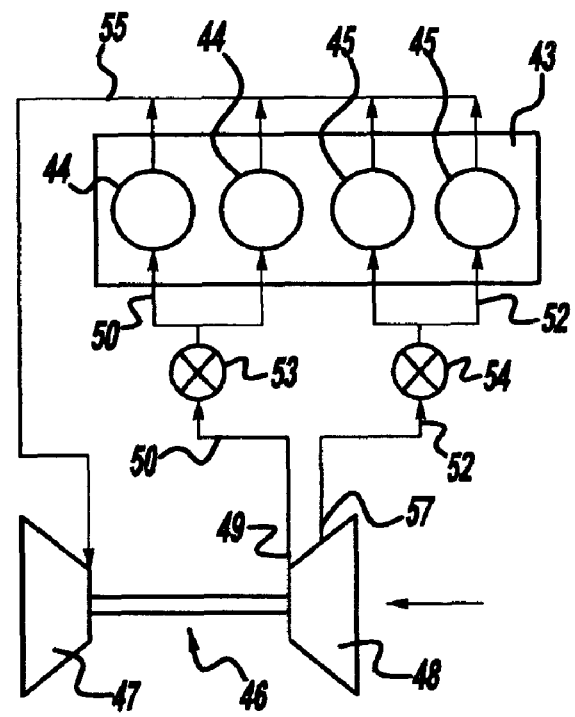
FIG. 7 is a schematic representation of the coupling of a variable displacement engine and a compressor with two separate outlets according to one aspect of the invention.

In FIG. 7, a schematic representation of the coupling of a VDE with the inventive compressor is shown. Engine 43 comprises a first group of cylinders 44 and a second group of cylinders 45, with the second group of cylinders 45 capable of being deactivated. A turbocharger 46 includes a turbine 46 and a compressor 48, driven by turbine 47. Compressor 48 comprises a first outlet 49, which is connected through a fluid, here air, conduit 50 to the first group of cylinders 44, and a second outlet 51, which is connected through a fluid, here air, conduit 52 to the second group of cylinders 45. A valve 53 is arranged in first fluid conduit 50 and a valve 54 is arranged in second fluid conduit 52. Both valves 53 and 54 are capable of controlling the airflow through their respective fluid conduits separately. Exhaust gases from cylinders 44 and 45 are exhausted into exhaust manifold 55 through turbine 47 of turbocharger 46.

When the second group of cylinders 45 is deactivated, airflow in the second fluid conduit 52 is automatically interrupted so that all the airflow in compressor 48 exits through first outlet 49 and flows through first fluid conduit 52 to first group of cylinders 44. With control valves 53 and 54, airflows passing coupled to first and second fluid conduits 51 and 52 are controlled to achieve a smooth transition of the airflows when activating and deactivating the second group of cylinders 45. In FIG. 7, valves 53 and 54 are shown as being separate from engine 43. Alternatively, valves 53 and 54 may be intake and/or exhaust valves of engine 43.

In FIG. 7, engine 43 is a 4-cylinder engine in which two of the cylinders are deactivatable, by way of example. The present invention is applicable to any VDE configuration, i.e., any multi-cylinder engine with any number of deactivatable cylinders. Furthermore, the present invention applies to any internal combustion engine, including engines other than a VDE with deactivatable cylinders, in which the range in airflow over the operating range of the engine is greater than can be provided by a conventional compressor when considering the limits due to surge and choking.

Thus, a system and method are disclosed for regulating engine idle speed by coordinating control of two actuators: a slow actuator and a fast actuator. The slow actuator is preferably a throttle valve and the fast actuator is preferably an ignition system affecting spark timing. The slow actuator is controlled based on an idle power requirement and the target idle speed; whereas the fast actuator is controlled based on the idle power requirement and the actual idle speed. Additionally, control of the two actuators is further based on a desired power reserve and an actual power reserve. Power reserve is related to the ratio of the power produced by the engine and the power that would be produced by the engine if the faster actuator were at its optimal setting.

It should be understood that while a two-air outlet compressor has been described, the compressor could include additional outlets each with a diffuser. With this design of either one or more than one of the can be closed. This provides an advantage by avoiding surging by adapting the compressor more precisely to an even wider range in airflow. Preferably, this is used when a variable displacement engine comprises a plurality of sets, or groups, of cylinders of which more than one is capable of being deactivated at different times.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. A compressor coupled to an internal combustion engine, comprising:
   a compressor housing defining an air inlet and a plurality of air outlets, the air outlets being adapted to receive air from the air inlet wherein substantially all air discharged from said plurality of air outlets is supplied to the engine;
   a rotatable shaft disposed within said housing;
   a plurality of impeller blades coupled to said rotatable shaft and disposed within said housing; and
   a plurality of circumferential diffusers disposed within said housing, each one of said diffusers being coupled to a corresponding one of said air outlets.

2. The compressor of claim 1, further including a separator coupled to said impeller blades wherein said separator distributes an air stream entering said air inlet among said plurality of diffusers.

3. The compressor of claim 1, further comprising stator blades arranged circumferentially in each of said diffusers.

4. The compressor of claim 1, including at least one partition wall separating a pair of said plurality of diffusers wherein said partition wall distributes an air stream entering said air inlet among said plurality of diffusers.

5. The compressor of claim 4, wherein each of said impeller blades has at least one slot extending radially inward and said at least one partition wall between each pair of diffuser extends radially into said slots of said impeller blades.

6. The compressor of claim 4, further including at lest one separator coupled to said impeller blades.

7. The compressor of claim 4, said partition wall being positioned substantially perpendicular with respect to an axis of rotation of said shaft.

8. A compressor, comprising:
   a shaft adapted to rotate about an axis;
   a plurality of impeller blades coupled to said rotatable shaft;
   a plurality of diffusers;
   a compressor housing having disposed therein said shaft, said diffusers, and said compressor wheel, said compressor housing defining an air inlet and a plurality of air outlets, each of said diffusers being coupled to one of said plurality of air outlets, said plurality of air outlets being coupled to engine cylinders; and
   at least one partition wall disposed in said housing, said partition wall separating a pair of said plurality of diffusers.

9. The compressor of claim 8, further comprising at least one separator coupled to said impeller blades.

10. The compressor of claim 8 wherein each of said impeller blades has at least one slot extending radially inward and said at least one partition wall between each pair of diffusers extends radially into said slots of said impeller blades.

11. The compressor of claim 8 wherein the plurality of sets of diffusers is disposed about a common circumference with respect to the axis.

12. The compressor of claim 11, further comprising stator blades disposed in said diffusers.

13. A compressor, comprising:
   a shaft adapted to rotate about an axis;
   a plurality of impeller blades coupled to said rotatable shaft;
   a first diffuser and a second diffuser;
   a compressor housing having disposed therein said shaft, said diffusers, and said compressor wheel, said compressor housing defining an air inlet, first and second air outlets, said first diffuser coupled to said first air outlet and second diffuser coupled to said second air outlet wherein said first air outlet is coupled to a first group of engine cylinders and said second air outlet is coupled to a second group of engine cylinders; and
   a partition wall disposed in said housing, said partition wall separating said first and second diffusers.

14. The compressor of claim 13, further comprising a separator coupled to each of said impeller blades.

15. The compressor of claim 13, wherein each of said impeller blades has a slot extending radially inward and said partition wall extends radially into said slots of said impeller blades.

16. The compressor of claim 13, further comprising stator blades disposed in said diffusers.

17. A variable displacement engine, comprising:
   a plurality of sets of combustion cylinders; and
   a compressor comprising:
      a rotatable shaft;
      a compressor wheel coupled to said shaft;
      a plurality of impeller blades coupled to said shaft;
      a plurality of diffusers; and
      a compressor housing having disposed therein said shaft, said diffusers, and said compressor wheel, said compressor housing defining an air inlet and a plurality of air outlets coupled to the air inlet and a plurality of diffusers each one being disposed in corresponding one of the air outlets, each of said sets of combustion cylinders being coupled to a unique one of said plurality of air outlets wherein said sets of combustion cylinders are non-overlapping sets.

18. The engine of claim 17, wherein said plurality of diffusers are arranged at a common circumference from an axis of rotation of the shaft.

19. The engine of claim 17, wherein said compression wheel further comprises a separator coupled to said impeller blades.

20. The engine of claim 17, further comprising a plurality of valves, each one coupled between a corresponding one of said plurality of sets of combustion cylinders and a corresponding one of the plurality of air outlets.

21. The engine of claim 17, wherein said plurality of diffusers comprise two diffusers and said two diffusers are separated by a partition wall.

22. The engine of claim 21, wherein said partition wall is substantially perpendicular to the axis of rotation of said shaft.

23. The engine of claim 21, wherein each of said impeller blades has a slot extending radially, said partition wall between said two diffusers extends radially into said slots.

24. A method for operating a variable displacement engine, comprising:
   providing a plurality of sets of independently activatable combustion cylinders;
   providing a compressor, further comprising: a compressor housing defining an air inlet and a plurality of air outlets; a rotatable shaft disposed within said housing; and a plurality of impeller blades coupled to said rotatable shaft and disposed within said housing; and a plurality of circumferentially diffusers contained within said housing, each one of said diffusers being coupled to a corresponding one of said air outlets which is further coupled to a corresponding one of said set of combustion cylinders; and
   deactivating at least one of said sets of combustion cylinders, thereby causing flow in said diffusers corresponding to said deactivated combustion cylinders to substantially stop.

25. The method of claim 24, wherein a valve is disposed in each of said air outlets coupled to said plurality of sets of combustion cylinders, the method further comprising closing said valves coupled to deactivated combustion cylinders.

* * * * *